3,275,506
MICROBIOCIDAL COMPOSITIONS

Karoly Szabo, Yonkers, and Silvio L. Giolito, Whitestone, N.Y., and Thomas B. Williamson, Santa Clara, Calif., assignors to Stauffer Chemical Company, New York, N.Y., a corporation of Delaware
No Drawing. Original application June 8, 1961, Ser. No. 116,278. Divided and this application May 14, 1965, Ser. No. 462,469
5 Claims. (Cl. 167—22)

This application is a division of application Serial No. 116,278, filed June 8, 1961, now abandoned.

This invention relates to halogenated lower alkylalkanethiolsulfonates and, in particular, to chlorinated lower alkylalkanethiolsulfonates and to methods of preparing and using such compounds.

The herein described chlorinated lower alkylalkanethiolsulfonates, which are useful as microbiocides, can be formalistically depicted as follows:

(I)          $R_1—SO_2—S—R$ wherein $R_1$ represents a lower alkyl group of from 1 to 2 carbon atoms which may or may not be monochlorinated and R designates a monochlorinated lower alkyl moiety. Compounds falling within the ambit of the above depicted formula which have been found particularly efficacious as pesticidal agents include those represented by the following sub-generic configuration:

(II)          $CH_3—SO_2—S—(CH_2)_nCl$ wherein $n$ stands for an integer of from 1 to 4.

Illustrative of structures falling within the definition of formulae I and II are the following:

Compound 1   $CH_3—SO_2—S—CH_2—CH_2CHCl—CH_3$
Compound 2   $CH_3—SO_2—S—CH_2—CHCl—CH_3$
Compound 3   $CH_3—SO_2—S—CH_2—CH_2CH_2Cl$
Compound 4   $CH_3—SO_2—S—(CH_2)_3—CH_2Cl$
Compound 5   $C_2H_5—SO_2—S—CH_2—CH_2Cl$
Compound 6   $ClCH_2—SO_2—S—CH_2Cl$
Compound 7   $CH_3CH_2—SO_2—S—CH_2CH_2Cl$
Compound 8   $CH_3—SO_2—S—CH_2Cl$
Compound 9   $CH_3—SO_2—S—CH_2—CH_2Cl$ The chlorinated lower alkylalkanethiolsulfonates as contemplated herein, which can also be regarded as S-chloroalkyl esters of lower alkanethiolsulfonic acids, are susceptible to a general preparation involving the reaction of metal salts of the requisite lower alkanethiolsulfonic acid with a bromo chlorinated lower alkane. In this condensation, a metal bromide salt is eliminated with concomitant formation of the desired lower alkylalkanethiolsulfonate. The reaction can be represented by the following equation:

$$R_1—SO_2—SM + Br—R \rightarrow R_1—SO_2—S—R + MBr$$

wherein R and $R_1$ have the values previously assigned and M represents a metal, preferably an alkali metal such as sodium, potassium and the like. In carrying out the reaction, it has been our finding that excellent results are obtained when the sodium salt of the lower alkanethiolsulfonate is heated with the necessary brom chlorinated lower alkane in the presence of an organic solvent such as a lower saturated aliphatic alcohol or ketone. After the reaction is completed, the metal salt is removed and the chlorinated alkylalkanethiolsulfonic acid isolated by procedures commonly employed in the art of organic chemistry, i.e., distillation, crystallization and similar techniques.

The following examples are inserted in order to illustrate, in greater detail, the herein described compounds including their method of preparation and uses thereof. However, many variations of practicing the invention will occur to those skilled in the art without departing from the spirit or scope of the said invention:

Example 1

$$CH_3—SO_2—S—C_2H_5Cl$$

134 g. of methanethiolsulfonic acid sodium salt and 170 g. 1-bromo-2 chloroethane and iso-butanol were placed in a reaction flask equipped with stirrer and reflux condenser and the mixture refluxed (94° C.) for four hours. The sodium bromide was filtered off and the solvent removed by distillation under reduced pressure leaving 95 g. of a yellow product having a refractive index of 1.5360 and boiling point of 140° C. at 1.5 mm.

Example 2

$$CH_3—SO_2—S—CH_2—CHCl—CH_3$$

50.0 g. of 3-bromo-1-chloropropane and a 15% mole excess of sodium methanethiolsulfonate in 400 ml. of acetone were refluxed several hours. The sodium bromide was filtered off and the filtrate concentrated in vacuo. The residue of yellow oil amounted to 30 g.

Example 3

$$CH_3—SO_2—(CH_2)_3—CH_2Cl$$

Following the procedure as given in Example 1, 1 mole of sodium methanethiolsulfonate was reacted with a 15% mole excess of 1-bromo-4-chlorobutane by heating in iso-butanol. The product, which is compound 4, was obtained in yields comparable to the first example.

The following example is illustrative of an ethanethiolsulfonate:

Example 4

$$C_2H_5—SO_2—S—CH_2—CH_2Cl$$

This compound was formed by condensing 1 mole of sodium ethanethiolsulfonate with a 15% mole excess of 1-bromo-2-chloroethane. The reaction was carried out at elevated temperature in iso-butanol. The results and yield paralleled the previous examples.

The chlorinated lower alkylethanethiolsulfonates of this invention are new and valuable compounds which exhibit bactericidal activity against a variety of microorganisms. These compounds are especially potent in controlling certain soil fungi such as Fusaria, Rhizoctonia, etc. The bactericidal activity of the herein contemplated compounds are illustrated in Table A:

TABLE A

| Compounds | R—S—SO$_2$—R$^1$ | In vitro vial test | | | Agar plate (bacteria) | | | Agar Fumigation, Percent | Soil bacteria | |
|---|---|---|---|---|---|---|---|---|---|---|
| | | Asperg. niger | Penicillium sp. | Others | S. aureus | Eruinia amylovora | Escher. Coli | | Rhizoctonia Solani | Fusarium |
| Compound 9 | R$_1$= —CH$_3$<br>R= —CH$_2$—CH$_2$Cl | 50 | 100 | R100 | 25 | 25 | 50 | 100 | 1 (27) | 1 13 |
| Compound 2 | R$_1$= —CH$_3$<br>R= —CH$_2$—CHCl—CH$_3$ | 50 | 50 | S100 | 10 | 10 | 50 | 20 | >110 | (13) |
| Compound 5 | R$_1$= —C$_2$H$_5$<br>R=CH$_2$—CH$_2$Cl | 50 | 50 | E25 | | | | 100 | >110 | >110 |
| Compound 6 | R= —CH$_2$Cl<br>R$_1$= —CH$_2$Cl | 5 | (5) | S10 | 100 | 50 | 500 | 50 | 55 | 1 (27) |

1 = Lowest concentration tested; quantity needed for control may go lower.
R = *Rhizopus nigricans*.
S = *Stemphylium sp.*
E = *Escherichia coli* (bacterium).
Numbers in columns, except those followed by percent, indicate p.p.m. needed for complete control.
Numbers in parentheses indicate partial control at rate (p.p.m.) shown.

The new compounds of the present invention are susceptible to other and numerous modes of application for controlling microorganisms. For instance, the products may be mixed with an inert finely divided solid and applied in the form of dusts or mists. In some instances, it may be desirable to disperse the compounds in water and the so-obtained dispersion employed in the form of a spray. If necessary, surface active agents may be resorted to in order to facilitate and stabilize the aforesaid dispersions. In other procedures, the products as herein described can be formulated as oil in water emulsions or water dispersions in which case again, resort may be had to surface active agents to facilitate forming the dispersions. Another application of our compounds includes dissolution in organic solvents followed by spraying the resulting solution in the manner commonly employed in the art.

We claim:

1. The method of inhibiting the growth of bacteria and fungi which comprises applying thereto a small but effective amount of chlorinated lower alkylalkanethiolsulfonate of the following formula:

$$R_1—SO_2—S—R$$

wherein R represents monochlorinated lower alkyl of from 2 to 4 carbon atoms and R$_1$ represents lower alkyl of from 1 to 2 carbon atoms.

2. The method of inhibiting the growth of bacteria and fungi which comprises applying thereto a small but effective amount of chlorinated lower alkylalkanethiolsulfonate of the following formula:

$$CH_3—SO_2—S—(CH_2)_nCl$$

wherein n stands for an integer of from 2 to 4.

3. The method of inhibiting the growth of bacteria and fungi which comprises applying thereto a small but effective amount of β-chloroethylmethanethiolsulfonate.

4. The method of inhibiting the growth of bacteria and fungi which comprises applying thereto a small but effective amount of 2-chloropropylmethanethiolsulfonate.

5. The method of inhibiting the growth of bacteria and fungi which comprises applying thereto a small but effective amount of β-chloroethylethanethiolsulfonate.

References Cited by the Examiner

UNITED STATES PATENTS 2,877,258   3/1959   Hardy et al. _____ 260—453

JULIAN S. LEVITT, *Primary Examiner.*

STANLEY J. FRIEDMAN, *Assistant Examiner.*

UNITED STATES PATENT OFFICE
CERTIFICATE OF CORRECTION

Patent No. 3,275,506                          September 27, 1966

Karoly Szabo et al.

It is hereby certified that error appears in the above numbered patent requiring correction and that the said Letters Patent should read as corrected below.

Column 2, line 32, the formula should appear as shown below instead of as in the patent:

$$CH_3-SO_2-S-CH_2-CH_2-CH_2Cl$$

Signed and sealed this 12th day of September 1967.

(SEAL)
Attest:

ERNEST W. SWIDER
Attesting Officer

EDWARD J. BRENNER
Commissioner of Patents